(12) United States Patent
Morikawa et al.

(10) Patent No.: US 11,643,781 B2
(45) Date of Patent: May 9, 2023

(54) RELEASE-PAPER BASE PAPER AND METHOD FOR PRODUCING SAME, AND RELEASE PAPER

(71) Applicant: KURARAY CO., LTD., Kurashiki (JP)

(72) Inventors: Keisuke Morikawa, Kurashiki (JP);
Taeko Kaharu, Kurashiki (JP);
Tadahito Fukuhara, Kurashiki (JP);
Yuki Tachibana, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 690 days.

(21) Appl. No.: 16/498,879

(22) PCT Filed: Mar. 29, 2018

(86) PCT No.: PCT/JP2018/013298
§ 371 (c)(1),
(2) Date: Sep. 27, 2019

(87) PCT Pub. No.: WO2018/181735
PCT Pub. Date: Oct. 4, 2018

(65) Prior Publication Data
US 2020/0087860 A1    Mar. 19, 2020

(30) Foreign Application Priority Data

Mar. 30, 2017    (JP) .............................. JP2017-068889

(51) Int. Cl.
| | |
|---|---|
| *D21H 19/12* | (2006.01) |
| *C08F 8/02* | (2006.01) |
| *C08F 16/06* | (2006.01) |
| *D21H 19/32* | (2006.01) |
| *D21H 27/00* | (2006.01) |

(52) U.S. Cl.
CPC ............... *D21H 19/12* (2013.01); *C08F 8/02* (2013.01); *C08F 16/06* (2013.01); *D21H 19/32* (2013.01); *D21H 27/001* (2013.01)

(58) Field of Classification Search
CPC ...... D21H 19/12; D21H 19/32; D21H 27/001; D21H 17/36; D21H 19/20; D21H 19/22; D21H 19/60; D21H 27/00; C08F 8/02; C08F 16/06
See application file for complete search history.

(56) References Cited

U.S. PATENT DOCUMENTS

| | | | |
|---|---|---|---|
| 6,153,054 A | 11/2000 | Reinhardt | |
| 9,243,161 B2 * | 1/2016 | Taoka | ........................ C08K 5/54 |
| 10,214,604 B2 * | 2/2019 | Kumaki | ........................ C09J 7/21 |
| 11,208,550 B2 * | 12/2021 | Fukuhara | ........................ C08F 2/20 |
| 11,352,751 B2 * | 6/2022 | Morikawa | ........................ C09D 129/04 |
| 2004/0024102 A1 * | 2/2004 | Hayes | ........................ B32B 7/12 |
| | | | 524/425 |
| 2004/0186232 A1 * | 9/2004 | Shibutani | ................... C08F 2/20 |
| | | | 525/61 |
| 2008/0248321 A1 | 10/2008 | Krumbacher et al. | |
| 2010/0288963 A1 * | 11/2010 | Mitina | .................... B82Y 30/00 |
| | | | 524/265 |
| 2011/0045313 A1 | 2/2011 | Gore et al. | |
| 2013/0040134 A1 | 2/2013 | Dufour et al. | |
| 2016/0160446 A1 * | 6/2016 | Michel | ................... D21H 19/60 |
| | | | 427/439 |
| 2017/0226247 A1 * | 8/2017 | Kumaki | ..................... C08F 8/12 |
| 2020/0087860 A1 * | 3/2020 | Morikawa | ................ C08F 16/06 |
| 2022/0220332 A1 * | 7/2022 | Tachibana | ............... C08K 3/015 |

FOREIGN PATENT DOCUMENTS

| | | | | |
|---|---|---|---|---|
| CN | 101099000 A | | 1/2008 | |
| CN | 102016173 A | | 4/2011 | |
| CN | 110325585 B | * | 2/2022 | .............. C08F 14/06 |
| CN | 110662869 B | * | 4/2022 | .............. C08F 16/06 |
| EP | 2735577 A1 | * | 5/2014 | ........... B32B 27/306 |
| EP | 3604672 A4 | * | 1/2021 | .............. C08F 16/06 |
| JP | 2009-209469 A | | 9/1920 | |
| JP | 8-284099 A | | 10/1996 | |
| JP | 10-510891 A | | 10/1998 | |
| JP | 11-277893 A | | 10/1999 | |
| JP | 11-323788 A | | 11/1999 | |
| JP | 11-323793 A | | 11/1999 | |
| JP | 2001-72720 A | | 3/2001 | |
| JP | 2003-55889 A | | 2/2003 | |
| JP | 2005-120115 A | | 5/2005 | |

(Continued)

OTHER PUBLICATIONS

Combined Chinese Office Action and Search Report dated Jun. 3, 2021 in Chinese Patent Application No. 201880035821.5 (with unedited computer generated English translation), 17 pages.

(Continued)

*Primary Examiner* — Jose A Fortuna
(74) *Attorney, Agent, or Firm* — Oblon, McClelland, Maier & Neustadt, L.L.P.

(57) ABSTRACT

Release paper base paper includes a substrate; and a coating agent containing a modified polyvinyl alcohol (A) and sodium acetate, the substrate coated with the coating agent, wherein the modified polyvinyl alcohol (A) has 0.005 mol % or more and less than 10 mol % of double bonds derived from unsaturated carboxylic acid or a derivative thereof (B) in side chains, has 1.4 mol % or more and 2.0 mol % or less of 1,2-glycol bond, units, and is water soluble, and a content of the sodium acetate relative to the modified polyvinyl alcohol (A) is 0.01 mass % or more and 10 mass % or less. The release paper base paper of the present invention is excellent in sealing properties for silicone. Use of the release paper base paper allows acceleration of curing of silicone in a release layer and improvement in adhesion between the substrate and the release layer.

9 Claims, No Drawings

(56) References Cited

FOREIGN PATENT DOCUMENTS

| | | | | |
|---|---|---|---|---|
| JP | 2005-194672 A | 7/2005 | | |
| JP | 2005-314859 A | 11/2005 | | |
| JP | 2010-236128 A | 10/2010 | | |
| JP | 2011-214158 A | 10/2011 | | |
| JP | 2013-531136 A | 8/2013 | | |
| JP | 7058260 B2 * | 4/2022 | ............. | C08F 16/06 |
| TW | 202204443 A * | 2/2022 | | |
| WO | WO-2018181735 A1 * | 10/2018 | ............. | C08F 16/06 |
| WO | WO-2020213550 A1 * | 10/2020 | ............. | C08F 16/06 |

OTHER PUBLICATIONS

International Search Report dated Jun. 5, 2018 in PCT/JP2018/013298 filed on Mar. 29, 2018.

* cited by examiner

RELEASE-PAPER BASE PAPER AND METHOD FOR PRODUCING SAME, AND RELEASE PAPER

TECHNICAL FIELD

The present invention relates to release paper base paper, including: a substrate; and a coating agent containing a modified polyvinyl alcohol (A) and sodium acetate, the substrate coated with the coating agent, and a method of producing the same. The present invention also relates to release paper including: the release paper base paper; and a release layer formed on a surface of the release paper base paper.

BACKGROUND ART

Polyvinyl alcohols (hereinafter, may be abbreviated as "PVAs") are specific synthetic polymers with crystallinity and hydrophilicity, and in the field of paper, are used as paper strength additives, dispersants for fluorescent white pigments, and binders for inorganic matters (calcium carbonate, clay, silica, etc.). PVAs are also excellent in film formability and are thus capable of giving barrier properties to gas and the like and greaseproofness by being applied on paper for coating.

Paper coated with such a PVA is sometimes used as barrier paper, and representative examples of the barrier paper may include release paper base paper. Release paper base paper is usually produced by coating a surface of a cellulose substrate with a PVA. On a surface of the release paper base paper, a release layer (silicone layer) is formed to obtain release paper. The PVA in such release paper serves as a filler to inhibit penetration of expensive silicone and platinum into the substrate paper. In recent years, there is a demand for release paper base paper that is capable of accelerating curing of silicone in the release layer, in addition to such sealing properties, and improving adhesion between the PVA layer and the silicone layer.

Patent Document 1 (JP 2005-194672 A) describes release paper base paper coated with a PVA having a silyl group satisfying a specific condition. Coating with such a PVA allows production of release paper base paper excellent in sealing properties. However, the effect of accelerating silicone curing and the effect of improving adhesion between the substrate and the silicone layer are insufficient.

Patent Document 2 (JP 2013-531136 A) describes a cellulose substrate coated with a PVA having double bonds introduced into side chains by acetalization reaction. Acetalization reaction usually uses highly volatile acid, such as hydrochloric acid and nitric acid, and such acid remaining in the acetalized PVA thus causes corrosion of the device in the coating step, which has been expected to be improved. In addition, the effect of accelerating curing of silicone in the release layer is insufficient.

SUMMARY OF THE INVENTION

Problems to be Solved by the Invention

The present invention has made to solve the above problems and it is an object thereof to provide release paper base paper, excellent in sealing properties for silicone in the release paper base paper and is capable of accelerating curing of silicone in the release layer and improving adhesion between the substrate and the release layer, and a method of producing the same. It is also an object of the present invention to provide release paper obtained using the release paper base paper.

Means for Solving the Problems

The above problems are solved by providing release paper base paper, comprising: a substrate; and a coating agent containing a modified polyvinyl alcohol (A) and sodium acetate, the substrate coated with the, coating agent, wherein the modified polyvinyl alcohol (A) has 0.005 mol % or more and less than 10 mol % of double bonds derived from unsaturated carboxylic acid or a derivative thereof (B) in side chains, has 1.4 mol % or more and 2.0 mol % or less of 1,2-glycol bond units, and is water soluble, and a content of the sodium acetate relative to the modified polyvinyl alcohol (A) is 0.01 mass % or more and 10 mass % or less.

At this time, it is preferred that the modified polyvinyl alcohol (A) has a viscosity-average degree of polymerization of 400 or more and less than 5000 and has a degree of saponification of 70.0 mol % or more and 99.9 mol % or less. In addition, it is preferred that the modified polyvinyl alcohol (A) further has ethylene units in a main chain and a content of the ethylene units is 1 mol % or more and 10 mol % or less.

The present invention also solves the above problems by providing a method of producing the above release paper base paper, comprising: a first step of obtaining the modified polyvinyl alcohol (A) by reacting the unsaturated carboxylic acid or a derivative thereof (B) with a polyvinyl alcohol (C); a second step of obtaining the coating agent by dissolving the modified polyvinyl alcohol (A) obtained in the first step and the sodium acetate in water; and a third step of coating the substrate with the coating agent obtained in the second step.

At this time, it is preferred that, in the first step, the modified polyvinyl alcohol (A) is obtained by reacting the unsaturated carboxylic acid or a derivative thereof (B) with the polyvinyl alcohol (C) in powder form having an average particle diameter from 50 to 500 μm. In addition, it is preferred that the coating agent obtained in the second step has a pH of 3.0 or more and 7.0 or less. Still in addition, it is preferred that the modified polyvinyl alcohol (A) is in powder form and the powder has a yellow index of less than 40.

A preferred embodiment of the present invention is release paper, comprising: such release paper base paper; and a release layer formed on a surface of the release paper base paper. At this time, it is preferred that the release layer contains addition-type silicone (D) and platinum (E) and 0.001 part by mass or more and 0.05 part by mass or less of the platinum (E) is contained based on 100 parts by mass of the addition-type silicone (D).

Effects of the Invention

The release paper base paper of the present invention is excellent in sealing properties for silicone. Use of the release paper base paper allows acceleration of curing of silicone in the release layer and improvement in adhesion between the substrate and the release layer. Accordingly, use of the release paper base paper of the present invention allows reduction in time taken for the step of curing addition-type silicone in production of release paper.

Modes for Carrying out the Invention (Release Paper Base Paper)

Release paper base paper of the present invention includes: a substrate; and a coating agent containing specific amounts of a modified polyvinyl alcohol (A) having double bonds derived from un saturated carboxylic acid or a derivative thereof (B) in side chains and sodium acetate, the substrate coated with the coating agent. The release paper base paper of the present invention has a low air permeation rate and is excellent in sealing properties for silicone. Use of such release paper base paper allows acceleration of curing of addition-type silicone in a release layer and improvement in adhesion with the release layer. The modified polyvinyl alcohol (A) herein may be abbreviated as the modified PVA (A) and the unsaturated carboxylic acid or a derivative thereof (B) herein may be abbreviated as the compound (B).

A method of producing the release paper base paper of the present invention preferably includes, but not particularly limited to, a first step of obtaining the modified polyvinyl alcohol (A) by reacting the unsaturated carboxylic acid or a derivative thereof (B) with a polyvinyl alcohol (C), a second step of obtaining the coating agent by dissolving the modified polyvinyl alcohol (A) obtained in the first step and the sodium acetate in water, and a third step of coating the substrate with the coating agent obtained in the second step. In this context, the polyvinyl alcohol (C) is a PVA having no double bonds derived from the compound (B) in side chains (hereinafter, may be referred to as "a PVA (C)").

(Modified PVA (A))

The PVA (C) may be produced by polymerizing a vinyl ester-based monomer, employing a conventionally known method, such as bulk polymerization, solution polymerization, suspension polymerization, emulsion polymerization, and dispersion polymerization. Preferred polymerization methods from an industrial perspective are solution polymerization, emulsion polymerization, and dispersion polymerization. For polymerization operation, it is possible to employ any mode of polymerization of a batch method, a semi-batch method, and a continuous method.

Examples of the vinyl ester-based monomer allowed to be used for the polymerization may include vinyl acetate, vinyl formate, vinyl propionate, vinyl caprylate, vinyl versatate, and the like. Among them, vinyl acetate is preferred from an industrial perspective.

Upon copolymerization of the vinyl ester-based monomer, the vinyl ester-based monomer may be copolymerized with another monomer without impairing the spirit of the present invention. Examples of the monomer allowed for use may include: α-olefins, such as ethylene, propylene, n-butene, and isobutylene; acrylic acid and salts thereof; acrylic esters, such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and salts thereof; methacrylic esters, such as methyl methacrylate ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide; acrylamide derivatives, such as N-methylacrylamide, N-ethylacrylamide, N,N-dimethylacrylamide diacetoneacrylamide, acrylamide propane sulfonic acid and salts thereof, acrylamidopropyl dimethylamine and salts thereof or quaternary salts thereof, and N-methylolacrylamide and derivatives thereof; methacrylamide; methacrylamide derivatives, such as N-methylmethacrylamide, N-ethylmethacrylamide, methacrylamide propane sulfonic acid and salts thereof, methacrylamidopropyl dimethylamine and salts thereof or quaternary salts thereof, N-methylolmethacrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile, vinyl halides, such as vinyl chloride and vinyl fluoride; vinylidene halides, such as vinylidene chloride and vinylidene fluoride; allyl compounds, such as allyl acetate and allyl chloride; unsaturated dicarboxylic acids, such as maleic acid, itaconic acid, and fumaric acid, and salts thereof or esters thereof; vinylsilyl compounds, such as vinyltrimethoxysilane; isopropenyl acetates; and the like. The amount of such another copolymerized monomer is usually 10 mol % or less.

In addition, polymerization of the unsaturated monomer may be carried out in the presence of a chain transfer agent for the purposes of adjusting the degree of polymerization of polyvinyl ester to be obtained and the like. Examples of the chain transfer agent may include aldehydes, such as acetaldehyde, propionaldehyde, butylaldehyde, and benzaldehyde; ketones, such as acetone, methylethylketone, hexanone, and cyclohexanone mercaptans, such as 2-hydroxyethanethiol and dodecyl mercaptan; and, hydrocarbon halides, such as trichloroethylene and perchloroethylene, and among all, aldehydes and ketones are used preferably. Although the amount of the added chain transfer agent is determined in accordance with the chain transfer constant of the chain transfer agent to be added and the degree of polymerization of the intended polyvinyl ester, it is desirably from 0.1 to 10 mass % relative to the vinyl ester-based monomer in general.

To saponification reaction of the polyvinyl ester, a conventionally known alcoholysis or hydrolysis reaction is applicable that uses a basic catalyst, such as sodium hydroxide, potassium hydroxide, and sodium methoxide, or an acidic catalyst, such as p-toluenesulfonic acid. Examples of the solvent used for the saponification reaction may include: alcohols, such as methanol and ethanol; esters, such as methyl acetate and ethyl acetate: ketones, such as acetone and methylethylketone; and aromatic hydrocarbons such as benzene and toluene, and one type of them may be used singly or two or more types of them may be used in combination. Among all, it is convenient and preferred to carry out the saponification reaction using methanol or a mixed solution of methanol and methyl acetate as a solvent in the presence of sodium hydroxide as a basic catalyst.

It is important that the modified PVA (A) used in the present invention is water soluble. The modified PVA (A) to be water soluble herein means that a 4 mass % concentration aqueous solution in which the modified PVA (A) is dissolved is obtained at a temperature of 98° C.

It is important that the modified PVA (A) has 0.005 mol % or more and less than 10 mol % of double bonds derived from the compound (B) in side chains. In this context, the modified PVA (A) having 0.005 mol % or more and less than 10 mol % of double bonds derived from the compound (B) in side chains means that the modified PVA (A) has double bonds derived from the compound (B) in side chains and the amount of the double bonds is 0.005 mol % or more and less than 10 mol % based on the total monomer units.

If the amount of the double bonds is less than 0.005 mol %, it is not possible to accelerate curing of silicone in the release layer. In addition, the adhesion between the substrate and the release layer becomes insufficient. The amount of the double bonds is preferably 0.01 mol % or more and more preferably 0.03 mol % or more. Meanwhile, a modified PVA (A) with an amount of the, double bonds of 10 mol % or more is difficult to produce, and even if produced, it has low productivity. The amount of the double bonds is preferably 5 mol % or less, more preferably 2 mol % or less, and even more preferably 1.5 mol % or less. The double bonds mean carbon-carbon double bonds.

The amount of the double bonds derived from the compound (B) in the modified PVA (A) may be measured by known methods. Specifically, measurement by $^1$H-NMR is convenient. The amount of the double bonds is preferably measured after removing the unreacted compound (B) in advance for purification. The purification method is not particularly limited and a method of washing with a solution not dissolving the modified PVA (A) but capable of dissolving the unreacted compound (B) is allowed while a reprecipitation method is convenient and preferred where the modified PVA (A) is once used to make an aqueous solution at a concentration approximately from 1 to 20 mass %, followed by dropping of the aqueous solution into a solution not dissolving the modified PVA (A) but capable of dissolving the unreacted compound (B) to precipitate the modified PVA (A) for purification.

The modified PVA (A) preferably has a viscosity-average degree of polymerization of 400 or more, more preferably 700 or more, and even more preferably 900 or more. Meanwhile, the modified PVA (A) preferably has a viscosity-average degree of polymerization of less than 5000, more preferably less than 3000, and even more preferably less than 2500. The viscosity-average degree of polymerization is a value obtained by measurement in accordance with JIS-K 6726: 1994. Specifically, when the degree of saponification is less than 99.5 mol %, the PVA is saponified to have a degree of saponification of 99.5 mol % or more and the viscosity-average degree of polymerization (P) is obtained by an equation below using the limiting viscosity [η] (liter/g) measured at 30° C. in water.

$$P=([\eta]\times 10^4/8.29)^{(1/0.62)}$$

From the perspective of water solubility of the modified PVA (A), the modified PVA (A) preferably has a degree of saponification of 70.0 mol %, more preferably 75.0 mol % or more, and even more preferably 80.0 mol % or more. Meanwhile the modified PVA (A) preferably has a degree of saponification of 99.9 mol % or less and more preferably 99.5 mol % or less. The degree of saponification is a value obtained by measurement in accordance with JIS-K 6726: 1994.

It is important that the modified PVA (A) has 1.4 mol % or more and 2.0 mol % or less of 1,2-glycol bond units. If the content of the 1,2-glycol bond units is less than 1.4 mol %, the coating agent subjected to shearing causes formation of fibrils, leading to insufficient coating stability. The fibrils mean fibrous precipitates obtained by the association of the modified PVA (A) contained in the coating agent. The content of the 1,2-glycol bond units is preferably 1.5 mol % or more and more preferably 1.6 mol % or more. Meanwhile, a modified PVA (A) having a content of the 1,2-glycol bond units of more than 2.0 mol % has high water absorbency, causing insufficient adhesion between the substrate and the release layer during storage. The content of the 1,2-glycol bond units is preferably 1.9 mol % or less and more preferably 1.8 mol % or less. The content of the 1,2-glycol bond units is obtained from $^1$H-NMR spectrum analysis as described in Examples later.

The method of adjusting the content of the 1,2-glycol bond units in the modified PVA (A) is not particularly limited, and examples employed for such a method include a method of copolymerizing vinylene carbonate to have the amount of the 1,2-glycol bond units in the PVA (C) in the above range, a method of polymerization under pressure at a polymerization temperature higher than a usual condition, specifically for example, from 75° C. to 200° C. In the latter method, the polymerization temperature is preferably 190° C. or less and more preferably 180° C. or less.

It is preferred that the modified PVA (A) further has ethylene units in a main chain and a content of the ethylene units is 1 mol % or more and 10 mol % or less. In this context, having the ethylene units in the main chain means that the modified PVA (A) has structural units (—(CH$_2$-CH$_2$)—) derived from an ethylene monomer in the main chain. The content of the ethylene units means the number of moles of the structural units derived from ethylene relative to the number of moles of monomer units constituting the main chain of the modified PVA (A).

The content of the ethylene units of 1 mol % or more allows production of the modified PVA (A) with more excellent hue. When the coating agent containing the modified PVA (A) and sodium acetate dissolved in water is applied on a substrate, such as paper, there is thus no risk of degradation of the color tone of the substrate. The content of the ethylene units is more preferably 1.5 mol % or more and even more preferably 2.5 mol % or more. Meanwhile, if the content of the ethylene units is more than 10 mol %, dissolution of the modified PVA (A) in water may cause a risk of producing an insoluble matter. The content of the ethylene units is more preferably 8 mol % or less. The modified PVA (A) having the ethylene units in the main chain is produced using a PVA having ethylene units in a main chain (ethylene-vinyl alcohol copolymer) as the PVA (C). It is thus possible to produce the PVA (C) having the ethylene units in such a manner by copolymerizing, a vinyl ester-based monomer with ethylene to obtain an ethylene-vinyl ester copolymer and then by saponifying the ethylene-vinyl ester copolymer.

(Compound (B))

Examples of the compound (B) used in the present invention may include: unsaturated monocarboxylic acids, such as acrylic acid, methacrylic acid, crotonic acid, isocrotonic acid, propynoic acid, 2-pentenoic acid, 4-pentenoic acid, 2-heptenoic acid 2-octenoic acid, cinnamic acid, myristoleic acid, palmitoleic acid, oleic acid, elaidic acid, vaccenic acid, gadoleic acid, erucic acid, nentonic acid, linoleic acid, linolenic acid, eleostearic acid, stearidonic acid, arachidonic acid, eicosapentaenoic acid, clupanodonic acid, docosahexaenoic acid, and sorbic acid; unsaturated dicarboxylic acids, such as maleic acid, fumaric acid, itaconic acid, citraconic acid, mesaconic acid, muconic acid, phenylmaleic acid, and chloromaleic acid; unsaturated tricarboxylic acids, such as aconitic acid; unsaturated carboxylic acid anhydrides, such as maleic anhydride, itaconic anhydride, and citraconic anhydride; unsaturated carboxylic acid alkyl esters, such as acrylic acid alkyl ester, methacrylic acid alkyl ester, and crotonic acid alkyl ester; unsaturated carboxylic acid hydroxy esters, such as 2-hydroxyethyl acrylate, 2-hydroxypropyl acrylate, 2-hydroxyethyl methacrylate, and 2-hydroxypropyl methacrylate; unsaturated carboxylic acid alkoxyesters, such as 2-methoxyethyl acrylate, 2-ethoxyethyl acrylate, 2-methoxyethyl methacrylate, and 2-ethoxyethyl methacrylate; unsaturated dicarboxylic acid monoesters, such as maleic acid monoalkyl esters like maleic acid monomethyl ester (monomethyl maleate), fumaric acid monoalkyl ester, and itaconic acid monoalkyl ester; and unsaturated dicarboxylic acid diesters, such as maleic acid dialkyl ester, fumaric acid dialkyl ester, and itaconic acid dialkyl ester. These carboxylic acids may also be used in the form of salts. One type of the carboxylic acids or salts thereof may be used singly or two or more types of them may be used together.

Among them, from the perspective of reactivity of the PVA (C) with a hydroxyl group the compound (B) is preferably unsaturated carboxylic acid, unsaturated carboxylic acid monoester, unsaturated monocarboxylic acid hydroxy ester, unsaturated dicarboxylic acid, unsaturated carboxylic acid anhydride, or unsaturated dicarboxylic acid monoester. From the perspective of ease of handling due to a somewhat high booing point, the compound (B) is more preferably methyl methacrylate, 3,3-dimethyl-4-methyl pentenoate, 2-hydroxyethyl methacrylate, maleic anhydride, citraconic acid, itaconic acid, fumaric acid, maleic anhydride, aconitic acid, phenylenaleic acid, chloromaleic acid, neuconic acid, or maleic acid monoalkyl ester. From the perspective of reactivity control, the compound (B) is even more preferably citraconic acid, fumaric acid, or itaconic acid.

(Sodium Acetate)

It is important that in the coating agent, a content of the sodium acetate relative to the modified PVA (A) is 0.01 mass % or more and 10 mass % or less. If the content of the sodium acetate is less than 0.01 mass %, the pH of the coating agent (coating liquid) becomes too low, causing a problem of corrosion of a coating machine. The content of the sodium acetate is preferably 0.05 mass % or more, more preferably 0.10 mass % or more, and even more preferably 0.15 mass % or more. Meanwhile, if the content of the sodium acetate is more than 10 mass %, it is not possible to improve the adhesion between the substrate and the release layer. The content of the sodium acetate is preferably 8 mass % or less, more preferably 7 mass % or less, and even more preferably 6 mass % or less.

A method of adding the sodium acetate is not particularly limited, and examples of the method may include (i) a method comprising reacting the compound (B) with the PVA (C) in the presence of the sodium acetate, (ii) a method comprising dissolving the modified PVA (A) and the sodium acetate in water, and the like. Among all, the method (ii) above is preferred.

(Other Components)

The coating agent used for the present invention may contain components other than the modified PVA (A) and the sodium acetate without inhibiting the effects of the present invention. Examples of such other components may include: aqueous dispersible resins, such as SBR latex, NBR latex, vinyl acetate-based emulsions, ethylene/vinyl acetate copolymer emulsions, (meth)acrylic ester-based emulsions, and vinyl chloride-based emulsions; raw starches obtained from wheat, corn, rice, potato, sweet potato, tapioca, sago palm, and the like; raw starch degradation products, such as oxidized starch and dextrin; starch derivatives, such as etherified starch, esterified starch, and cationized starch; cellulose derivatives, such as methylcellulose, hydroxyethylcellulose, and carboxymethylcellulose (CMC); monosaccharides, such as glucose, fructose, isomerized sugar, and xylose; disaccharides, such as maltose, lactose, sucrose, trehalose, palatinose, reduced maltose, reduced palatinose, and reduced lactose; oligosaccharides, such as starch syrup, isomaltooligosaccharide, fructooligosaccharide, lactose oligosaccharide, soybean oligosaccharide, xylooligosaccharide, coupling sugar, and cyclodextrin compounds; polysaccharides, such as pullulan, pectin, agar, konjak mannan, polydextrose, and xanthan gum; albumin; gelatin; casein; gum arabic; polyamide resins; melamine resins; poly(meth)acrylamide; polyvinylpyrrolidone; sodium poly(meth)acrylate; anion modified PVAs; sodium alginate; water soluble polyester; and the like.

Examples of such other components may also include pigments. Examples of the pigments may include inorganic pigments (clay, kaolin, aluminum hydroxide, calcium carbonate, talc, etc.) and organic pigments (plastic pigments, etc.) that are generally used in the field of coated paper production.

Examples of such other components may further include viscosity modifiers, adhesion improvers, defoamers, plasticizers, waterproofing agents, antiseptics, antioxidants, penetrants, surfactants, fillers, starches and derivatives thereof, latexes, and the like.

The content of these other components in the coating agent is usually 50 parts by mass or less based on 100 parts by mass of the modified PVA (A).

(Method of Producing Release Paper Base Paper)

The release paper base paper of the present invention is release paper base paper including a substrate and a coating agent containing a modified PVA (A) and sodium acetate, the substrate coated with the coating agent. A method of producing the release paper base paper preferably includes, but not particularly limited to: a first step of obtaining the modified PVA (A) by reacting the compound (B) with the PVA (C); a second step of obtaining the coating agent by dissolving the modified PVA (A) obtained in the first step and the sodium acetate in water; and a third step of coating the substrate with the coating agent obtained in the second step.

In the first step, the modified PVA (A) is obtained by reacting the compound (B) with the PVA (C). At this time, for acceleration of the reaction, it is preferred heat during the reaction. The heating temperature is preferably from 80° C. to 180° C. The heating time is appropriately set with respect to the heating temperature and is usually from 10 minutes to 24 hours.

In the first step, the modified PVA (A) may also be obtained by reacting the compound (B) with the PVA (C) in the presence of a compound having a conjugated double bond and two or more hydroxyl groups bonded to the conjugated double bond or a salt thereof or an oxide thereof (hereinafter, abbreviated as "a compound (F)"). In this context, the hydroxyl groups bonded to the conjugated double bond mean hydroxyl groups bonded to carbons constituting a conjugated carbon-carbon double bond. The hydroxyl groups may be bonded to carbon constituting a conjugated carbon-carbon double bond, the bonding sites are not particularly limited, and the total number of the hydroxyl groups may be two or more. The reaction of the compound (B) with the PVA (C) in the presence of such a compound (F) allows production of the modified PVA (A) with an even better color tone.

Examples of the compound having conjugated double bond may include: aromatic hydrocarbons, such as benzene; α,β-unsaturated carbonyl compounds having carbon-carbon double bonds conjugated with carbonyl groups in the molecule; and the like. The compound (F) is preferably a compound in which two or more hydroxyl groups are bonded to aromatic hydrocarbon or a salt thereof or an oxide thereof, more preferably a compound in which two or more hydroxyl groups are bonded to aromatic hydrocarbon, and even more preferably phenolic carboxylic acid or phenolic carboxylic ester. The phenolic carboxylic acid is exemplified by gallic acid, and the phenolic carboxylic ester is exemplified by gallic acid alkyl ester. The amount of the compound (F) in the first step is preferably 0.001 part by mass or more and less than 5 parts by mass based on 100 parts by mass of the PVA (C).

Although a method of reacting the compound (B) with the PVA (C) is not particularly limited, examples of the method may include: (i) a method comprising dissolving the compound (B) and the PVA (C) in a solvent and reacting the compound (B) with the PVA (C) in the solution; (ii) a method comprising reacting the compound (B) in powder form with the PVA (C) in powder form without a solvent; (iii) a method comprising adding the PVA (C) in powder form to a solution in which the compound (B) is dissolved in a solvent for swelling, followed by removing the solvent to obtain mixed powder, and heating the mixed powder thus obtained; and the like.

The solvent used in the method (i) is not particularly limited as long as the solvent is capable of dissolving the compound (B) and the PVA (C). Examples of the solvent may include water, dimethyl sulfoxide, and the like. The solution preferably has a solid content concentration from 1 to 40 mass %.

In the method (iii), examples of the solvent used to dissolve the compound (B) may include: alcohols, such as methanol, ethanol, and propanol; esters, such as methyl acetate; water, and the like. The solvent may be removed by heating or pressure reduction.

In the method (ii) or (iii), the amount of the compound (B) in the mixed powder before heating is preferably 0.01 part by mass or more based on 100 parts by mass of the PVA (C), more preferably 0.1 part by mass or more, and particularly preferably 0.5 part by mass or more. Meanwhile, the amount of the compound (B) in the mixed powder before heating is preferably 15 parts by mass or less based on 100 parts by mass of the PVA (C), more preferably 10 parts by mass or less, even more preferably 5 parts by mass or less, and particularly preferably 3.5 parts by mass or less.

Employment of the method (i) causes a problem that, to increase the amount of modification of the double bonds derived from the compound (B), a large amount of the compound (B) has to be charged or the reaction takes longer time. Although use of a catalyst is considered to increase the reactivity, there is a risk that the catalyst remains in the modified PVA (A) thus obtained, causing hydrolysis during storage of the compound (B) having bonded to the modified PVA (A) by esterification, and as a result, a decrease in performance of release paper base paper or release paper thus obtained. To obtain the modified PVA (A), many steps are required such as a step of dissolving the PVA (C), a step of reacting with the compound (B), a step of washing, and a step of removing the solvent, sometimes causing a problem of productivity and production costs. From such a perspective, the method (ii) or (iii) above is preferably employed. The method (ii) above is preferred to put emphasis on the productivity or the production costs, and the method (iii) above is preferred to put emphasis on the homogeneity of the modified PVA (A).

It is preferred that, in the first step, the modified polyvinyl alcohol (A) is obtained by reacting the compound (B) with the PVA (C) in powder form having an average particle diameter from 50 to 500 µm. If the average particle diameter is less than 50 µm, there is a risk of causing the PVA (C) to be too fine powder, resulting in complexity of handling. The average particle diameter is more preferably 100 µm or more and even more preferably 150 µm or more. Meanwhile, if the average particle diameter is more than 5000 µm, there is a risk of reducing the reactivity with the compound (B) and not introducing a required amount of the double bonds derived from the compound (B). The average particle diameter is more preferably 3000 µm or less and even more preferably 1000 µm or less. The average particle diameter indicates, when the PVA (C) is classified by perforated plates prepared to have mesh size at approximately 50 µm intervals, the mesh size of the perforated plate with the largest number of remained PVA (C). The average particle diameter of the PVA (C) in the method (iii) above means the average particle diameter of the PVA (C) before added to the solution.

It is preferred that the powder of the modified PVA (A) obtained in the first step has a yellow index (hereinafter, may be abbreviated as "a YI") of less than 40. If the YI is 40 or more, there is a risk of, when the coating agent is applied on a substrate, such as paper, degradation of the color tone of the substrate. The YI is more preferably 30 or less, even more preferably 25 or less, and particularly preferably 20 or less. The YI herein is a value measured and calculated in accordance with JIS-Z 8722: 2009 and JIS-K 7373: 2006.

In the second step, the coating agent is obtained by dissolving the modified PVA (A) obtained in the first step and the sodium acetate in water (solvent). The solvent to dissolve the modified PVA (A) and the sodium acetate may contain components other than water. Examples of such other components may include hydrophilic solvents. Examples of the hydrophilic solvents may include: alcohols, such as methanol, ethanol, and isopropanol; ketones, such as acetone and methylethylketone; ethers, such as tetrahydrofuran, cellosolves, carbitols; nitriles, such as acetonitrile; and the like. The coating agent may contain inorganic particles insoluble in water, such as clay. The content of the components other than water in the coating agent is preferably 50 mass % or less and more preferably 20 mass % or less.

The coating agent preferably has a solid content concentration from 2 to 30 mass %. If the solid content concentration is less than 2 mass %, there is a risk that the paper is increasingly impregnated with the coating agent and reducing the sealing effect for silicone. The solid content concentration is more preferably 4 mass % or more. Meanwhile, if the solid content concentration is more than 30 mass %, there is a risk of difficulty in leveling when the coating agent is applied on paper and degradation of the state of the coated surface. The solid content concentration is ma re preferably 25 mass % or less.

The coating agent obtained in the second step preferably has a pH of 3.0 or more and 7.0 or less. The coating agent having a pH in the, above range allows even more reduction in corrosion of the coating machine. The coating agent more preferably has a pH of 3.5 or more and even more preferably 4.0 or more. The coating agent more preferably, has a pH of 6.8 or less.

In the third step, paper as the substrate is coated with the coating agent obtained in the second step. As the paper, it is possible to use known paper or synthetic paper obtained by papermaking with chemical pulp, such as hardwood kraft pulp and softwood kraft pulp, mechanical pulp, such as GP (groundwood pulp), RGP (refiner groundwood pulp), and TMP (thermomechanical pulp), and the like. As the paper, it is also possible to use wood free paper, wood containing paper, alkaline paper, glassine paper, semi-glassine paper, board and white lined board used for corrugated boards, for building materials, for white lined chipboards, for chipboards, and the like. The paper may contain organic and inorganic pigments and papermaking aids, such as paper strength additives, sizing agents, and retention aids. The paper may also be subjected to various types of surface treatment.

Coating with the coating liquid may be carried out in general paper coating facilities, and the substrate may be coated with the coating agent as a monolayer or divided into multilayers by an on-machine coater or an off-machine coater equipped with a coating device, such as a blade coater, an air knife coater, a transfer roll coater, a rod metering size press coater, a curtain coater, and a wire bar coater, for example. Examples of a method of drying after coating to be appropriately employed may include various heat drying methods, such as heating with hot air, heating with a gas heater, and heating, with an iffrared heater. The amount of coating is preferably from 0.3 to 5.0 g/m² in terms of solid content. If the amount of coating is less than 0.3 g/m², there is a risk of reducing the sealing effect for silicone. The amount of coating is more preferably 0.5 g/m² or more. Meanwhile if the amount of coating is more than 5.0 g/m², the surface of a filling layer formed on the substrate may be excessively smooth, causing a decrease in the surface area of the substrate and thus sufficient adhesion with the silicone layer is not sometimes obtained even when the silicone layer is formed later. The amount of coating is more preferably 3.0 g/m² or less.

In the present invention, as a method to determine the sealing effect of the filling layer, air permeability may be used that is measured using a smoothness and air permeability tester by the Oken method in accordance with JIS-P 8117: 2009. The air permeability is preferably 1500 sec or more, more preferably 2000 sec or more, even more preferably 5000 sec or more, particularly preferably 10000 sec or more, and most preferably 30000 sec or more. If the air permeability is less than 2000 sec, there is a risk of a decrease in the sealing effect. A smaller value of the air permeability (sec) means a higher air permeation rate.

To enhance the sealing effect, smoothing treatment may be carried out, without impairing the effect, after coating and drying of the coating liquid. Examples of the smoothing treatment to be preferably employed may include super calender, gloss calender, multi-nip calender, soft calender, belt-nip calender, and the like.

(Release Paper)

A preferred embodiment of the present invention is release paper, including: the release paper base paper described above; and a release layer formed on a surface of the release paper base paper. At this time, it is preferred that the release layer contains addition-type silicone (D) and platinum (E) and 0.001 part by mass or more and 0.05 part by mass or less of the platinum (E) is contained based on 100 parts by mass of the addition-type silicone (D). The amount of the platinum (E) in such a range allows production of release paper excellent in silicone curability. If the amount of the platinum (E) is less than 0.001 part by mass, curing of the addition-type silicone (D) does not proceed sufficient and treatment at high temperatures is required. The amount of the platinum (E) is preferably 0.002 part by mass or more and more preferably 0.004 part by mass or more. Meanwhile if the amount of the platinum (E) is more than 0.05 part by mass, an economic problem occurs due to the high cost. The amount of the platinum (E) is preferably 0.03 part by mass or less and more preferably 0.02 part by mass or less.

(Addition-Type Silicone (D))

The addition-type silicone (D) used for the present invention is obtained by hydrosilylation reaction of organopolysiloxane (d1) containing at least two carbon-carbon double bonds reactive with a SiH group in one molecule with organohydrogenpolysiloxane (d2) containing at least two SiH groups in one molecule in the presence of a platinum catalyst.

The organopolysiloxane (d1) containing at least two carbon-carbon double bonds reactive with a SiH group in one molecule is organopolysiloxane containing at least two carbon-carbon double bonds in one molecule, such as a vinyl group, an allyl group, a propenyl group, an isopropenyl group, a butenyl group, an isobutenyl group, and a hexenyl group. The organopolysiloxane is exemplified by, for example, those having repeating units of diorganosiloxane in a main chain and a triorganosiloxane structure at an end, and may have a branched or cyclic structure. The organo group bonded to silicon in the end or the repeating units is exemplified by a methyl group, an ethyl group, a phenyl group, and the like. Specific examples may include methylphenylpolysiloxane having vinyl groups at both ends.

The organohydrogenpolysiloxane (d2) containing at least two SiH groups in one molecule is organopolysiloxane containing two or more SiH groups at an end and/or in a repeating structure. The organopolysiloxane is exemplified by, for example, those having repeating units of diorganosiloxane in a main chain and a triorganosilaxane structure at an end, and may have a branched or cyclic structure. The organo group bonded to silicon in the end or the repeating units exemplified by a methyl group, an ethyl group, an octyl group, a phenyl group, and the like, two or more of which being substituted with hydrogen.

The addition-type silicone (D) used for the present invention is appropriately selected from a solvent type, a non-solvent type, and an emulsion type, and from the perspective of reduction in environmental load and coatability, the addition-type silicone of a non-solvent type is preferably employed. Examples of the addition-type silicone (D) of a non-solvent type may include: silicones produced by Dow Corning Toray Co., Ltd., such as SP7015, SP7259, SP7025, SP7248S, SP7268S, SP7030, SP7265S, LTC1006L, and LTC1056L; silicones produced by Shin-Etsu Silicone, such as KNS-3051, KNS-320A, KNS-316, KNS-3002, KNS-3300, and X-62-1387; silicones produced by Wacker Asahikasei Silicone Co., Ltd., such as DEHESIVE920, DEHESIVE921, DEHESIVE924, DEHESIVE927, and DEHESIVE929; silicones produced by Arakawa Chemical Industries, Ltd., such as KF-SL101, KF-SL201, KF-SL202, KF-SL301, and KF-SL302; silicones produced by Momentive Performance Materials Inc., such as TPR6600 and SL6625; and the like. These silicones do not have to be used singly and two or more types of them may be used by mixing them as needed.

(Platinum (E))

For curing of silicone, a platinum catalyst is usually used, and the type of platinum catalyst used for the present invention is not particularly limited. Those curing the addition-type silicone (D) by hydrosilylation reaction are preferably used. Examples of the platinum catalyst may include: platinum catalysts produced by Dow Corning Toray Co., Ltd., such as SP7077R and SRX212; platinum catalysts produced by Arakawa Chemical Industries, Ltd., such as CATA93B; and the like. These platinum catalysts do not have to be used singly and two or more types of them may be used by mixing them as needed. The amount of the platinum (E) is obtained by determining platinum in the platinum catalyst with an ICP emission spectrophotometer or the like.

(Method of Producing Release Paper)

Although a method of producing the release paper of the present invention is not particularly limited, a preferably employed method includes: coating a substrate with a coating agent containing the modified PVA (A) and the sodium acetate to form a filling layer on the substrate; and then coating the filling layer with a coating liquid prepared to have the addition-type silicone (D) and the platinum (E) in respective amounts of the above ranges to form a release layer. The amount of coating with the coating liquid to form the release layer is preferably, but not particularly limited to, from 0.1 to 5 g/m² in terms of solid content. If the amount of coating is less than 0.1 g/m², the release properties are sometimes worse. The amount of coating is more preferably 0.3 g/m² or more in terms of solid content. If the amount of coating is more than 5 g/m², there is a risk of reducing the adhesion between the filling layer and the release layer containing the addition-type silicone (D) and the platinum (E). The amount of coating is more preferably 3 g/m² or less in terms of solid content. Although various methods may be used as the coating method, a blade coater, an air knife coater, a bar coater, and the like are preferred.

The release layer in the release paper of the present invention may contain components other than the addition-type silicone (D) and the platinum (E) without inhibiting the effects of the present invention. The amount of such other components to be blended is usually 30 parts by mass or less based on 100 parts by mass of the total amount of the release layer. Examples of such other components may include viscosity modifiers, adhesion improvers, defoamers, plasticizers, waterproofing agents, antiseptics, antioxidants, penetrants, surfactants, inorganic pigments, organic pigments, fillers, starches and derivatives thereof, celluloses and derivatives thereof, saccharides, latexes, and the like.

EXAMPLES

Although an even more detailed description is given below to the present invention with reference to Examples, the present invention is not at all limited to Examples below. In Examples below, "%" and "parts" respectively mean "mass %" and "parts by mass" unless otherwise specified.

[Viscosity-Average Degree of Polymerization of PVA]

The viscosity-average degree of polymerization of the PVA was measured by a method in accordance with JIS-K 6726: 1994. Specifically, when the degree of saponification was less than 99.5 mol %, the PVA was saponified to have a degree of saponification of 99.5 mol % or more and the viscosity-average degree of polymerization (P) was obtained by an equation below using the limiting viscosity [η] (liter/g) measured at 30° C. in water.

$$P=([\eta]\times 10^4/8.29)^{(1/0.62)}$$

[Degree of Saponification of PVA]

The degree of saponification of the PVA was obtained by the method described in JIS-K 6726: 1994.

[Amount of Double Bonds Introduced into Modified PVA (A)]

The modified PVA (A) was subjected to measurement of the amount of the double bonds introduced into the modified PVA (A) using $^1$H-NMR. The amount of the double bonds is an amount of the double bonds based on the total monomer units in the modified PVA (A).

[Content of 1,2-Glycol Bond Units in PVA]

A modified PVA (A) obtained in each Example below was added to a methanol solution of sodium hydroxide and kept at 60° C. for 5 hours for resaponification of the modified PVA (A). At this time, the amount of sodium hydroxide was 0.1 mol relative to 1 mol of vinyl alcohol units in the modified PVA (A). The PVA thus obtained was subjected to Soxhlet extraction with methanol for 1 week to obtain a purified PVA having a degree of saponification of 99.9 mol % or more.

The purified PVA obtained in the above method was dried under reduced pressure at 90° C. for 2 days, to completely remove the methanol. The purified PVA was then dissolved in dimethyl sulfoxide-$d_6$ to make a 0.1 mass % solution, and several drops (approximately 0.1 ml) of trifluoroacetic acid were added to the solution to measure $^1$H-NMR. The content of 1,2-glycol bond units (monomer units bonded by 1,2-glycol bond) contained in the purified PVA was calculated from a peak (integral value a) from 3.2 to 4.0 ppm derived from methine protons in the vinyl alcohol units and a peak (integral value β) at 3.25 ppm derived from one methine proton in the 1,2-glycol bond units in accordance with an equation (I) below. At this point, the content of the 1,2-glycol bond units in the modified PVA (A) does not change before and after the resaponification, and thus the value obtained by the equation (I) below becomes the content of the 1,2-glycol bond units in the modified PVA (A).

Content of 1,2-Glycol Bond Units in PVA (mol%)=100×β/α　　(I)

Example 1

[Production of Modified PVA (A)]

To a separable flask, 400 parts by mass of dimethyl sulfoxide (DMSO), 100 parts by mass of a PVA, as the PVA (C), having a viscosity-average degree of polymerization of 500, having a degree of saponification of 88.2 mol %, and a content of 1,2-glycol bond units of 1.6 mol % were added and subjected to a raise in temperature to 105° C. while stirring to obtain a homogeneous solution. To the homogeneous solution, 44 parts by mass methyl methacrylate as the compound (B) and 1.1 parts by mass of phenothiazine were added and stirred to homogeneity. After becoming homogeneous, 1.8 parts by weight of zinc nitrate hexahydrate was added as a transesterification catalyst for reaction for 5 hours and then left for cooling to room temperature. To the reaction solution, 100 parts by mass of DMSO was added for dilution, followed by dropping of 1000 parts by mass of methanol to precipitate a modified PVA. The precipitated modified PVA was washed twice with 1000 parts by mass methanol and then vacuum dried to obtain a modified PVA (A).

The modified PVA (A) thus obtained was subjected to $^1$H-NMR measurement to find out that the content of the double bonds was 1.00 mol %. The viscosity-average degree of polymerization was 500, the degree of saponification was 87.1 mol % and the content of the 1,2-glycol bond units was 1.6 mol %. The results are shown in Table 1.

[Yellow Index (YI) of Powder of Modified PVA (A)]

The yellow index (YI) of powder of the modified PVA (A) was measured by removing powder of less than 100 μm and more than 1000 μm from powder of the modified PVA (A) thus obtained using sieves (mesh size of 100 μm and 1000 μm) and then using a color meter (SM-T-H1 manufactured by Suga Test Instruments Co., Ltd.). The yellow index was a value measured and calculated in accordance with JIS-Z 8722: 2009 and JIS-K 7373: 2006. As a result, the powder of the modified PVA (A) had a yellow index (YI) of 18. The result is shown in Table 2.

[Evaluation of Water Solubility of modified PVA (A)]

The modified PVA (A) thus obtained was dissolved in water at 98° C. to prepare a 4 mass % aqueous solution. The aqueous solution was visually inspected to evaluate in accordance with the following evaluation criteria. The result is shown in Table 2.

A: It was dissolved at 98° C.

B: An insoluble matter was found in the solution at 98° C.

[Preparation of Release Paper Base Paper]

A 6 mass % aqueous solution of the modified PVA (A) was prepared and sodium acetate was added to the aqueous solution to have the content of the sodium acetate relative to the modified PVA (A) of 1.3 mass % to obtain a coating agent. Glassine paper having an air permeability of 100 seconds was coated with the coating agent using a wire bar to have the amount of coating of approximately 1 g/m$^2$ in dry mass. After coating, it was dried at 100° C. for 5 minutes to obtain coated paper. The coated paper thus obtained was subjected to treatment twice at 70° C. and 400 kg/cm$^2$ in a super calender to obtain release paper base paper.

[pH of Coating Agent]

The pH of the coating agent used for preparation of the release paper base paper was measured. Since a lower pH means the coating liquid to be a stronger acidic solution, it causes a problem of corrosion of the coating machine. The result is shown in Table 2.

[Coating Stability]

The coating agent used for preparation of the release paper base paper was diluted with water to have the modified PVA (A) at a concentration of 2 mass %. The diluted aqueous solution was stirred at 20° C. and 200 rpm to observe the presence of fibrils produced in the aqueous solution for evaluation of coating stability. The result is shown in Table 2.

A: No fibrils were produced.

B: Fibrils were produced.

[Evaluation of Air Permeability of Release Paper Base Paper]

The air permeability of the release paper base paper was measured using a smoothness and air permeability tester of Oken method in accordance with JIS-P 8117: 2009 to be used as an index of sealing properties for silicone. The result is shown in Table 2.

[Evaluation of Silicone Curability]

Using LTC1056L produced by Dow Corning bray Co., Ltd. as the addition-type silicone (D) and SRX212 as the platinum catalyst, the release paper base paper thus obtained was coated by a blade coater with a coating liquid mixed to have a ratio of the addition-type silicone (D) to the platinum (E) at 100/0.007 for a coating amount of 1.5 g/m$^2$ in terms of solid content. A silicone layer was thus formed on the release paper base paper. It was then heat treated at 110° C. to measure the time until the silicone was cured. In this context, the time until the silicone was cured means time (seconds) taken until no peeling at all found in the silicone layer while the silicone layer was strongly rubbed 10 times with a finger at predetermined time intervals. The result is shown in Table 2.

[Evaluation of Adhesion of Release Layer]

Using LTC1056L produced by Dow Corning Toray Co., Ltd. as the addition-type silicone (D) and SRX212 as the platinum catalyst, the release paper base paper thus obtained was coated by a blade coater with a coating liquid mixed to have a ratio of the addition-type silicone (D) to the platinum E) at 100/0.009 for a coating amount of 1.5 g/m$^2$ in terms of solid content. It was then heat treated at 110° C. for 90 seconds to obtain release paper with a release layer (silicone layer) formed on the release paper base paper. The release paper thus obtained was evaluated by the following indices. The result is shown in Table 2.

A: After leaving in the conditions of 40° C. and 90% RH for 1 week, the silicone layer was strongly rub bed with a finger. As a result, the silicone layer did not peel. After leaving in the same conditions for another 1 week, the silicone layer was strongly rubbed with a finger. As a result, the silicone layer did not peel.

B: After leaving in the conditions of 40° C. and 90% RH for 1 week, the silicone layer was strongly rubbed with a finger. As a result. the silicone layer did not peel. However, after leaving in the same conditions for another 1 week. the silicone layer was strongly rubbed with a finger and the silicone layer was peeled.

C: After leaving in the conditions of 40° C. and 90% RH for 1 week, the silicone layer was strongly rubbed with a finger. As a result, the silicone layer was peeled.

Example 2

A modified PVA (A) was produced in the same manner as in Example 1 other than changing the type of PVA (C) and the amount of the compound (B) as shown in Table 1 and using 1.9 parts by mass of sodium acetate instead of the zinc nitrate hexahydrate as the transesterification catalyst. The production conditions of the modified PVA (A) are shown in Table 1, and the analysis results are shown in Tables 1 and 2. Then, a coating agent was obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

Example 3

[Production of Modified PVA (A)]

To a reactor provided with a stirrer, a reflux condenser tube, a nitrogen introduction tube, and a reactant addition port, 100 parts by mass of a PVA, as the PVA (C), having a viscosity-average degree of polymerization of 1000, having a degree of saponification of 99.5 mol %, having an amount of ethylene modification of 6 mol %, and having a content of the 1,2-glycol bond units of 1.7 mol % and 400 parts by mass of DMSO were added to prepare a solution at a concentration of 20 mass %. To the solution, 65 parts by mass of 3,3-methyl dimethylpentenoate as the compound (B) and 0.4 part by mass of tetramethylammonium methyl carbonate as the catalyst were added and subjected to a raise in temperature to 100° C. under a nitrogen flow and heat stirring for 130 minutes. The solution was then dropped into methanol, and the polymer was isolated and vacuum dried at 40° C. overnight to obtain the modified PVA (A). The analysis results of the modified PVA (A) thus obtained are shown in Tables 1 and 2.

A coating agent was then obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

Example 4

[Production of Modified PVA (A)]

A solution was prepared by dissolving 100 parts by mass of a PVA powder (average particle diameter of 500 μm), as the PVA (C), having a viscosity-average degree of polymerization of 1000, having a degree of saponification of 99.5 mol %, having an amount of ethylene modification of 6 mol %, and having a content of the 1,2-glycol bond units of 1.7 mol %, 2.63 parts by mass of fumaric acid as the compound (B), and 0.2 part by mass of propyl gallate as the compound (F) in 150 parts by mass of methanol, and was poured into a flask and mixed to swell the PVA powder, followed by removal of methanol by pressure reduction. It was then heat treated while stirring at 85° C. for 1 hour, at 90° C. for 1 hour, and at 120° C. for 4 hours for reaction to obtain a modified PVA (A). The modified PVA (A) thus obtained was subjected to reprecipitation purification and the amount of the double bonds was calculated, and it was 0.19 mol %. The results are shown in Table 1.

A coating agent was then obtained in the same manner as in Example 1 other than changing the amount of the sodium acetate as shown in Table 2.

The evaluation results of the coating agent are shown in Table 2. The performances of the release paper base paper and the re lease paper were evaluated in the same manner as in Example 1. The results are shown in Table 2.

Examples 5 through 11, Comparative Examples 1 through 6

A modified PVA (A) was produced in the same manner as in Example 4 other than changing the type of PVA (C) and the type and the amount of the compound (B) as shown in Table 1. The production conditions of the modified PVA (A) are shown in Table 1, and the analysis results are shown in Tables 1 and 2. A coating agent was then obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

Example 12

A solution was prepared by dissolving 100 parts by mass of PVA powder, as the PVA (C), having a viscosity-average degree of polymerization of 1700, having a degree of saponification of 99.5 mol %, having an amount of methyl acrylate modification of 5 mol %, and having a content of the 1,2-glycol bond units of 1.7 mol %, 5.90 parts by mass of 2-hydroxyethyl methacrylate as the compound (B) and 0.2 part by mass of propyl gallate as the compound (F) in 150 parts by mass of methanol, and was poured into a flask and mixed to swell the PVA powder, followed by removal of methanol by pressure reduction. It was then heat treated while stirring at 85° C. for 1 hour, at 90° C. for 1 hour, and at 120° C. for 4 hours for reaction to obtain a modified PVA (A). The modified PVA (A) thus obtained was subjected to reprecipitation purification, and the amount of the double bonds was calculated and it was 0.09 mol %. The results are shown in Table 1.

A coating agent was then obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

Example 13

[Production of Modified PVA (A)]

In a flask, 100 parts by mass of PVA powder, as the PVA (C), having a viscosity-average degree of polymerization of 1000, having a degree of saponification of 99.5 mol %, and having an amount of ethylene modification of 6 mol %, 1.77 parts by mass of itaconic acid as the compound (B), and 0.2 part by mass of propyl gallate as the compound (F) were placed. After mixing, it was heat treated while stirring directly in solid form at 85° C. for 1 hour, at 90° C. for 1 hour, and at 120° C. for 4 hours for reaction to obtain a modified PVA (A). The modified PVA (A) thus obtained was subjected to reprecipitation purification, and the amount of the double bonds was calculated to find out that the amount of the double bonds was 0.12 mol %, the degree of saponification was 99.3 mol %, the viscosity-average degree of polymerization was 1000, and the amount of ethylene modification was 6 mol %. The results are shown in Table 1.

A coating agent was then obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

Comparative Example 7

A mixture was made by mixing 100 parts by mass of a PVA, as the PVA (C), having a viscosity-average degree of polymerization of 1000, having a degree of saponification of 99.5 mol %, having a content of the 1,2-glycol bond units of 1.7 mol %, and having an amount of ethylene modification of 6 mol % and 0.30 part by mass of maleic anhydride. It was then placed in a batch mixer set at 200° C. and 100 rpm for melt kneading for 5 minutes. The mixture thus obtained turned yellow and was a gel insoluble even in water. Therefore, the subsequent preparation of release paper base paper was not performed.

Comparative Example 8

A modified PVA (A) was produced in the same manner as in Example 1 other than changing the type of PVA (C) and the amount of the compound (B) as shown in Table 1 and not using the transesterification catalyst. The production conditions of the modified PVA (A) are shown in Table 1, and the analysis results are shown in Tables 1 and 2. A coating agent was then obtained in the same manner as in Example 1 other than changing the amount of the sodium acetate as shown in Table 2. The evaluation results of the coating agent are shown in Table 2. The performances of the release paper base paper and the release paper were evaluated in the same manner as in Example 1. The results are shown in Table 2.

TABLE 1

| | PVA (C) | | | | | Compound (B) | |
|---|---|---|---|---|---|---|---|
| | Viscosity-Average Degree of Polymerization | Degree of Saponification (mol %) | 2,1-Glycol Amount (mol %) | Ethylene Modification Amount (mol %) | Average Particle Degree of (μm) | Type | parts by mass*[3] |
| Example 1 | 500 | 88.2 | 1.6 | — | *[1] | Methyl Methacrylate | 44 |
| Example 2 | 1700 | 98.5 | 1.8 | — | *[1] | Methyl Methacrylate | 67 |
| Example 3 | 1000 | 99.5 | 1.7 | 6 | *[1] | 3,3-Methyl Dimethylpentenoate | 65 |
| Example 4 | 1000 | 99.5 | 1.7 | 6 | 500 | Fumaric Acid | 2.63 |
| Example 5 | 1700 | 96.5 | 1.4 | 2 | 600 | Fumaric Acid | 2.63 |
| Example 6 | 2400 | 88.7 | 1.7 | — | 500 | Fumaric Acid | 2.63 |
| Example 7 | 1000 | 99.5 | 1.7 | 6 | 500 | Citraconic Acid | 2.95 |
| Example 8 | 1000 | 99.5 | 1.7 | 6 | 500 | Itaconic Acid | 1.77 |
| Example 9 | 1000 | 99.5 | 1.7 | 6 | 500 | Itaconic Acid | 11.8 |
| Example 10 | 1000 | 99.5 | 1.7 | 6 | 500 | Itaconic Acid | 0.30 |
| Example 11 | 800 | 72 | 1.6 | — | 200 | Itaconic Acid | 0.60 |
| Example 12 | 1700 | 99.5 | 1.7 | (5)*[4] | 100 | 2-Hydroxyethyl Methacrylate | 5.90 |
| Example 13 | 1000 | 99.5 | 1.7 | 6 | 500 | Itaconic Acid | 1.77 |
| Comparative Example 1 | 1700 | 98.5 | 1.8 | — | — | — | — |
| Comparative Example 2 | 800 | 72.0 | 1.6 | — | — | — | — |
| Comparative Example 3 | 1000 | 99.5 | 1.3 | 6 | 500 | Itaconic Acid | 0.30 |
| Comparative Example 4 | 1000 | 99.5 | 1.7 | 6 | 500 | Itaconic Acid | 11.8 |
| Comparative Example 5 | 1000 | 99.5 | 1.7 | 6 | 500 | Itaconic Acid | 1.77 |
| Comparative Example 6 | 800 | 72 | 2.2 | — | 200 | Itaconic Acid | 0.60 |
| Comparative Example 7 | 1000 | 99.5 | 1.7 | 6 | *[2] | Maleic Anhydride | 0.30 |
| Comparative Example 8 | 1000 | 99.5 | 1.7 | 6 | *[1] | Itaconic Acid | 1.77 |

| | Modified PVA (A) | | | | |
|---|---|---|---|---|---|
| | Viscosity-Average Degree of Polymerization | Degree of Saponification (mol %) | 2,1-Glycol Amount (mol %) | Ethylene Modification Amount (mol %) | Double Bond Amount (mol %) |
| Example 1 | 500 | 87.1 | 1.6 | — | 1.00 |
| Example 2 | 1700 | 95.0 | 1.8 | — | 3.50 |
| Example 3 | 1000 | 98.3 | 1.7 | 6 | 1.20 |
| Example 4 | 1000 | 99.3 | 1.7 | 6 | 0.19 |
| Example 5 | 1700 | 96.4 | 1.4 | 2 | 0.13 |
| Example 6 | 2400 | 88.5 | 1.7 | — | 0.12 |
| Example 7 | 1000 | 99.3 | 1.7 | 6 | 0.18 |
| Example 8 | 1000 | 99.3 | 1.7 | 6 | 0.08 |
| Example 9 | 1000 | 99.1 | 1.7 | 6 | 0.53 |
| Example 10 | 1000 | 99.5 | 1.7 | 6 | 0.01 |
| Example 11 | 800 | 72.0 | 1.6 | — | 0.05 |
| Example 12 | 1700 | 99.5 | 1.7 | (5)*[4] | 0.09 |
| Example 13 | 1000 | 99.3 | 1.7 | 6 | 0.12 |
| Comparative Example 1 | — | — | — | — | — |
| Comparative Example 2 | — | — | — | — | — |
| Comparative Example 3 | 1000 | 99.5 | 1.3 | 6 | 0.01 |
| Comparative Example 4 | 1000 | 99.1 | 1.7 | 6 | 0.53 |

TABLE 1-continued

|  |  |  |  |  |  |  |
|---|---|---|---|---|---|---|
| Comparative Example 5 | | 1000 | 99.3 | 1.7 | 6 | 0.08 |
| Comparative Example 6 | | 800 | 72.0 | 2.2 | — | 0.05 |
| Comparative Example 7 | | No Evaluation Possible due to Gelation | | | | |
| Comparative Example 8 | | 1000 | 99.5 | 1.7 | 6 | <0.005 |

*1) PVA (C) and Compound (B) were Reacted in Solution.
*2) PVA (C) and Compound (B) were Melt Kneaded.
*3) Amount based on 100 parts by mass of PVA (C).
*4) Amount of Methyl Acrylate Modification.

TABLE 2

| | Modified PVA (A) | | Coating Agent | | | Performance Evaluation of Release Paper Base Paper | Performance Evaluation of Release Paper | |
|---|---|---|---|---|---|---|---|---|
| | YI | Water Solubility | Na Acetate (mass %) | pH | Coating Stability | Air Permeability (sec) | Silicone Curability (sec) | Adhesion |
| Example 1 | 18 | A | 1.3 | 6.5 | A | 1,600 | 60 | A |
| Example 2 | 21 | A | 1.0 | 6.3 | A | 100,000< | 60 | A |
| Example 3 | 11 | A | 1.1 | 6.5 | A | 65,000 | 60 | A |
| Example 4 | 11 | A | 6.0 | 4.4 | A | 100,000< | 60 | A |
| Example 5 | 12 | A | 5.9 | 4.3 | A | 100,000< | 60 | A |
| Example 6 | 20 | A | 5.0 | 4.1 | A | 100,000< | 60 | A |
| Example 7 | 11 | A | 5.6 | 4.2 | A | 100,000< | 60 | A |
| Example 8 | 10 | A | 1.2 | 4.5 | A | 100,000< | 60 | A |
| Example 9 | 13 | A | 4.8 | 4.2 | A | 100,000< | 60 | B |
| Example 10 | 7 | A | 0.9 | 4.3 | A | 100,000< | 80 | B |
| Example 11 | 16 | A | 1.0 | 4.3 | A | 2,700 | 120 | A |
| Example 12 | 24 | A | 1.1 | 6.6 | A | 100,000< | 60 | A |
| Example 13 | 17 | A | 1.2 | 4.6 | A | 100,000< | 60 | A |
| Comparative Example 1 | 7*5) | A | 0.01 | 6.8 | A | 100,000< | 120< | C |
| Comparative Example 2 | 13*5) | A | 0.08 | 6.8 | A | 3,000 | 120< | C |
| Comparative Example 3 | 7 | A | 0.9 | 4.3 | B | 100,000< | 60 | A |
| Comparative Example 4 | 13 | A | 0.008 | 2.8 | A | 100,000< | 60 | A |
| Comparative Example 5 | 10 | A | 12.0 | 4.8 | A | 100,000< | 80 | C |
| Comparative Example 6 | 17 | A | 1.2 | 4.4 | A | 2,700 | 120 | C |
| Comparative Example 7 | — | B | — | — | — | — | — | — |
| Comparative Example 8 | 7 | A | 0.5 | 6.2 | A | 100,000< | 120< | C |

*5) YI of PVA (C).

The invention claimed is:

1. A release paper base paper, comprising: a substrate coated with a coating agent, wherein the coating agent comprises a modified polyvinyl alcohol (A) and sodium acetate, wherein
the modified polyvinyl alcohol (A) has 0.005 mol % or more and less than 10 mol % of double bonds derived from unsaturated carboxylic acid or at least one selected from the group consisting of unsaturated carboxylic acid anhydride, unsaturated carboxylic acid ester and unsaturated carboxylic acid salt, has 1.4 mol % or more and 2.0 mol % or less of 1,2-glycol bond units, and is water soluble, and
a content of the sodium acetate relative to the modified polyvinyl alcohol (A) is 0.01 mass % or more and 10 mass % or less.

2. The release paper base paper according to claim 1, wherein the modified polyvinyl alcohol (A) has a viscosity-average degree of polymerization of 400 or more and less than 5000 and has a degree of saponification of 70.0 mol % or more and 99.9 mol % or less.

3. The release paper base paper according to claim 1, wherein the modified polyvinyl alcohol (A) further has ethylene units in a main chain and a content of the ethylene units is 1 mol % or more and 10 mol % or less.

4. A release paper, comprising: the release paper base paper according to claim 1; and a release layer formed on a surface of the release paper base paper.

5. The release paper according to claim 4, wherein the release layer comprises addition-type silicone (D) and platinum (E), and 0.001 part by mass or more and 0.05 part by mass or less of the platinum (E) is present based on 100 parts by mass of the addition-type silicone (D).

6. A method of producing the release paper base paper according to claim 1, comprising:
  (i) obtaining the modified polyvinyl alcohol (A) by reacting the unsaturated carboxylic acid or a derivative thereof (B) with a polyvinyl alcohol (C);
  (ii) obtaining the coating agent by dissolving the modified polyvinyl alcohol (A) obtained in (i) and the sodium acetate in water; and
  (iii) coating the substrate with the coating agent obtained in (ii).

7. The production method according to claim 6, wherein, in (i), the modified polyvinyl alcohol (A) is obtained by reacting the unsaturated carboxylic acid or a derivative thereof (B) with the polyvinyl alcohol (C) in powder form having an average particle diameter from 50 to 500 μm.

8. The production method according to claim 6, wherein the coating agent obtained in (ii) has a pH of 3.0 or more and 7.0 or less.

9. The production method according to claim 6, wherein the modified polyvinyl alcohol (A) is in powder form and the powder has a yellow index of less than 40.

\* \* \* \* \*